United States Patent

Chou

[11] Patent Number: 5,854,466
[45] Date of Patent: Dec. 29, 1998

[54] HAND-HELD PIVOTING ELECTRIC HEAT SEALING APPARATUS

[75] Inventor: Ammy Chou, Taipei Hsien, Taiwan

[73] Assignee: Welcome Company, Ltd., Taiwan

[21] Appl. No.: 917,358

[22] Filed: Aug. 26, 1997

[51] Int. Cl.$^6$ .................................................. H05B 3/00
[52] U.S. Cl. .......................... 219/227; 219/243; 219/524; 156/579; 156/583.9
[58] Field of Search .................................... 219/227–230, 219/243, 221, 240–241, 535, 544, 524; 156/579, 515, 583.1, 583.2, 583.8, 583.9, 379.6, 499

[56] References Cited

U.S. PATENT DOCUMENTS

| | | | |
|---|---|---|---|
| 2,465,722 | 3/1949 | Hamilton | 219/243 |
| 3,196,067 | 7/1965 | Techtmann | 156/583.8 |
| 3,624,349 | 11/1971 | Mayer | 219/243 |
| 3,655,487 | 4/1972 | Farkas | 156/359 |
| 3,912,575 | 10/1975 | Zelnick | 156/583.2 |
| 4,172,750 | 10/1979 | Giulie | 219/243 |
| 4,219,724 | 8/1980 | Allvin | 219/243 |
| 5,142,123 | 8/1992 | Chou | 219/243 |
| 5,374,806 | 12/1994 | Chou . | |

*Primary Examiner*—John A. Jeffery
*Attorney, Agent, or Firm*—Jeffer, Mangels Butler & Marmaro LLP

[57] ABSTRACT

A hand-held electric heat sealing apparatus including a casing, a heat sealing unit and a press handle, wherein a safety switch is mounted in the casing and shifted to stop metal contact plates of the heat sealing unit from contacting the two terminals of a power supply circuit in the casing; the heat sealing unit includes a heat insulative base having a projecting block, an electric heating wire fastened to the projecting block and connected to two opposite metal contact plates of the heat sealing unit, a cover shell covered on the casing over the heat insulative base and having a center opening through which the projecting block of the heat insulative base projects out of the cover shell, a heat insulative sheet covered over the electric heating wire, and a cover frame fastened to the cover shell to hold the heat insulative sheet in place; the casing has a rear chamber, an electric socket in the rear chamber for receiving an electric plug, and an upright stop rod disposed in the rear chamber adapted for holding the electric wire of the electric plug in place.

19 Claims, 9 Drawing Sheets

5,854,466

HAND-HELD PIVOTING ELECTRIC HEAT SEALING APPARATUS

BACKGROUND OF THE INVENTION

The present invention relates to electric heat sealing apparatus, and more particularly to an improved structure of hand-held electric heat sealing apparatus.

Various hand-held heat sealing apparatus have been disclosed, and have appeared on the market. U.S. Pat. No. 5,142,123 discloses an example of conventional hand-held heat sealing apparatus. The conventional heat sealing apparatus are functional, however they are not safe in use.

SUMMARY OF THE INVENTION

According to one aspect of the present invention, the hand-held heat sealing apparatus includes a casing, a heat sealing unit mounted in the casing and supported on a compression spring, a press handle pivotally connected to the casing and acted against the heat sealing unit, and a safety switch mounted in the casing and shifted to stop metal contact plates of the heat sealing unit from contacting the two terminals of a power supply circuit in the casing. According to another aspect of the present invention, the hand-held electric heat sealing apparatus can be an AC type hand-held electric heat sealing apparatus, a DC type hand-held electric heat sealing apparatus, or an AC/DC dual usage type hand-held electric heat sealing apparatus. According to still another aspect of the present invention, the heat sealing unit comprises heat insulative base having a projecting block, an electric heating wire fastened to the projecting block and to two opposite metal contact plates of the heat sealing unit, a cover shell covered on the casing over the heat insulative base and having a center opening through which the projecting block of the heat insulative base projects out of the cover shell, a heat insulative sheet covered over the electric heating wire, and a detachable cover frame fastened to the cover shell to hold the heat insulative sheet in place. Because the cover frame is detachable, the heat insulative sheet can be conveniently replaced. According to still another aspect of the present invention, the casing comprises a top chamber, and a top cover plate covered on the top chamber, wherein the top chamber comprises two upright side walls at two opposite sides, a rigid member, for example, a metal case mounted on the inside and stopped between the upright side walls, and a plurality of hooks raised from the upright side walls, the top cover plate having two downward mounting flanges respectively forced into engagement with the hooks of the upright side walls of the top chamber. According to still another aspect of the present invention, the casing has a rear chamber, an electric socket in the rear chamber for receiving an electric plug, and an upright stop rod disposed in the rear chamber adapted for holding the electric wire of the electric plug in place.

DETAILED DESCRIPTION OF THE PREFERRED EMBODIMENT

Figure 1:
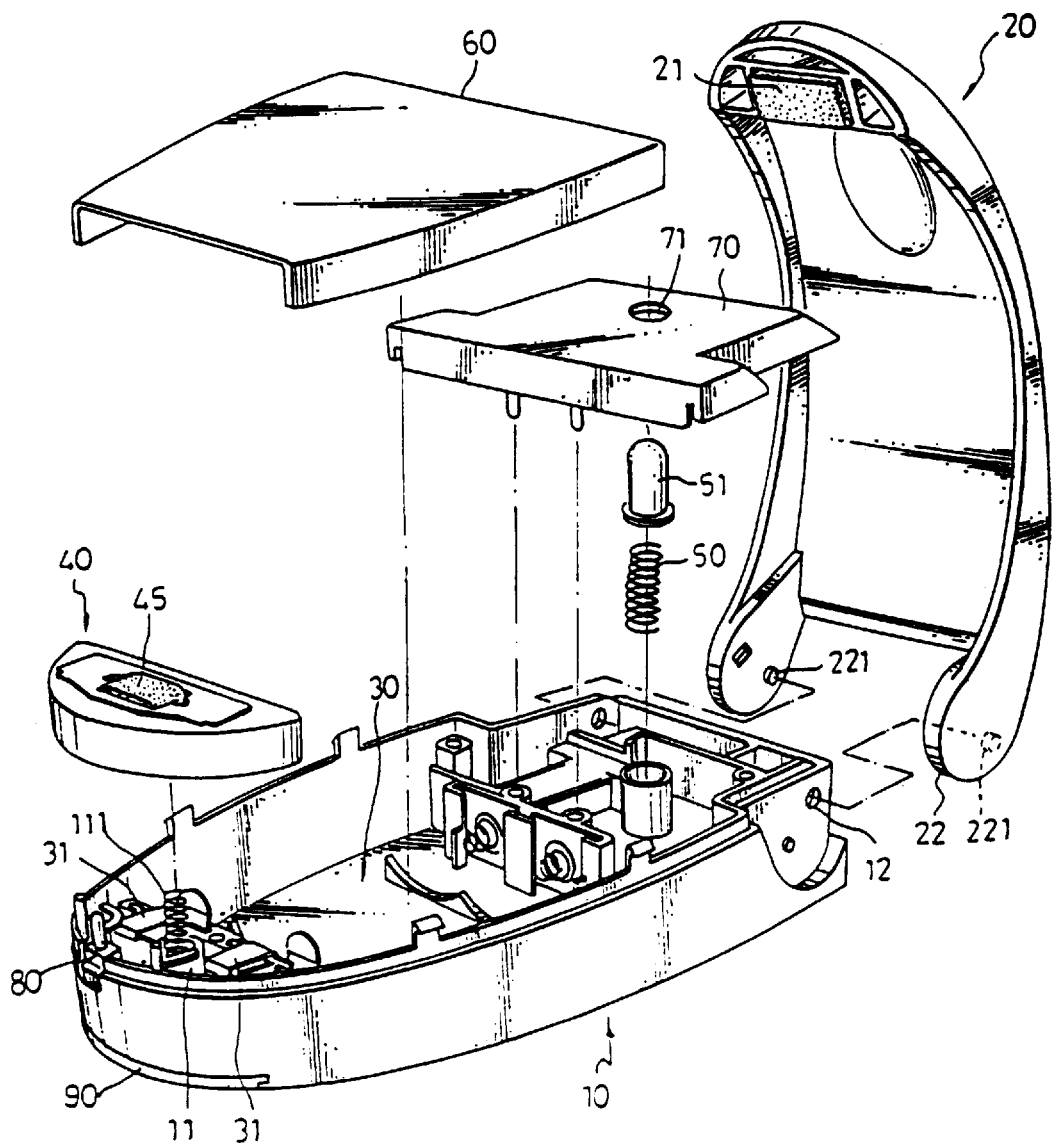
FIG. 1 is an exploded view of a hand-held electric heat sealing apparatus according to one embodiment of the present invention.

Referring to FIG. 1, a hand-held electric heat sealing apparatus comprises a casing 10 defining a chamber 30 adapted for holding a battery set. A pair of metal contact plates 31 are mounted inside the casing 10, and respectively connected to the two opposite terminals of the battery set mounted in the chamber 30. A cylindrical upright support 11 is disposed inside the casing 10 near its front end. A compression spring 111 is mounted on the upright support 11. A heat sealing unit 40 is supported on the compression spring 111, and moved vertically relative to the casing 10.

Figure 2:
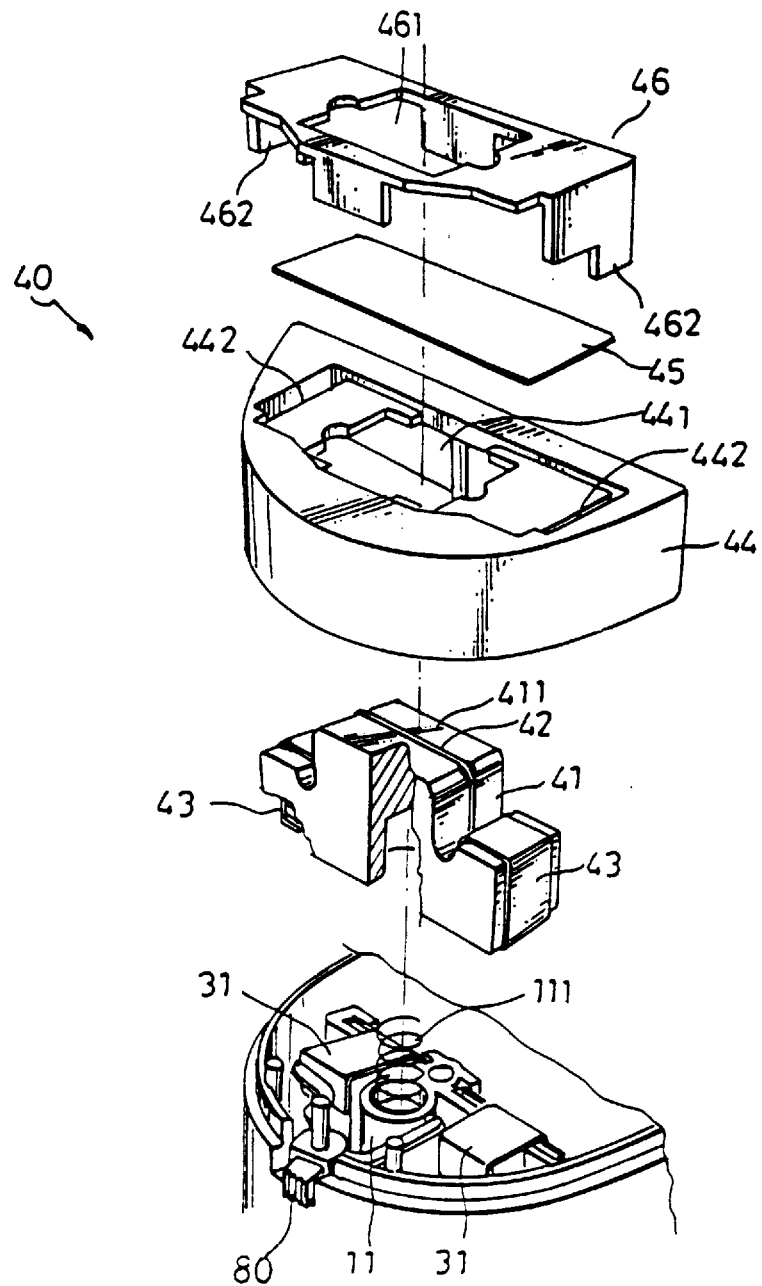
FIG. 2 is an exploded view of the heat sealing unit of the hand-held electric heat sealing apparatus shown in FIG. 1.

Referring to FIG. 2, the heat sealing unit 40 comprises a heat insulative base 41, an electric heating wire 42, a pair of metal contact plates 43, a cover shell 44, a heat insulative sheet 45, and a cover frame 46. The heat insulative base 41 comprises a projecting block 411 raised from its top side in the middle. The electric heating wire 42 is fastened to the projecting block 411 of the heat insulative base 41. The metal contact plates 43 are respectively fastened to two opposite sides of the heat insulative base 41 to hold down the electric heating wire 42. The cover shell 44 is covered on a front part of the casing 10 over the heat insulative base 41, and has a center opening 441 through which the projecting block 411 of the heat insulative base 41 projects out of the cover shell 44, and two insertion slots 442 equally spaced from the center opening 441 at two opposite sides. The heat insulative sheet 45 is covered on the projecting block 411 of the heat insulative base 41 over the electric heating wire 42, and disposed outside the cover shell 44. The cover frame 46 is covered on the cover shell 44 to hold the heat insulative sheet 45 in place. The cover frame 46 comprises two downward plug strips 462 at two opposite ends respectively plugged into the insertion slots 442 of the cover shell 44, and a center opening 461 corresponding to the center opening 441 of the cover shell 44. The heat insulative sheet 45 is preferably made from a meshed metal sheet coated with TEFLON® (polytetrafluoroethylene) that protects the electric heating wire 42 and provides a smooth contact surface.

Referring to FIG. 1 again, a press handle 20 is pivotally connected to one end, namely, the rear end of the casing 10 remote from the heat sealing unit 40. The press handle 20 comprises a heat insulative pad 21 transversely disposed at one end, and a pair of lugs 22 longitudinally and bilaterally disposed at an opposite end. The lugs 22 have a respective stub pivot pin 221 at an inner side respectively mounted in a respective pivot hole 12 at the rear end of the casing 10. Further, a spring 50 is mounted inside the casing 10 near its rear end and covered with a spring cap 51. The spring 50 imparts an upward pressure to the press handle 20, causing the press handle 20 to be supported in a lifted position in which the heat insulative pad 21 is spaced from the heat insulative sheet 45 of the heat sealing unit 40 at a distance. A rear cover plate 70 is covered on the rear end of the casing 10, having a through hole 71 through which the spring cap 51 projects out of the rear cover plate 70. An intermediate cover plate 60 is covered on the middle part of the casing 10 between the heat sealing unit 40 and the rear cover plate 70.

Figure 3:
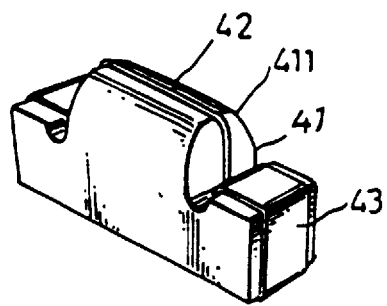
FIG. 3 is an elevational view of an alternate form of the heat insulative base for the heat sealing unit according to the present invention.

Referring to FIG. 3 and FIG. 2 again, the projecting block 411 of the heat insulative base 41 may be variously shaped. For example, the projecting block 411 shown in FIG. 2 has a rectangular profile; the projecting block 411 shown in FIG. 3 has a smoothly arched cross section.

Figure 11:
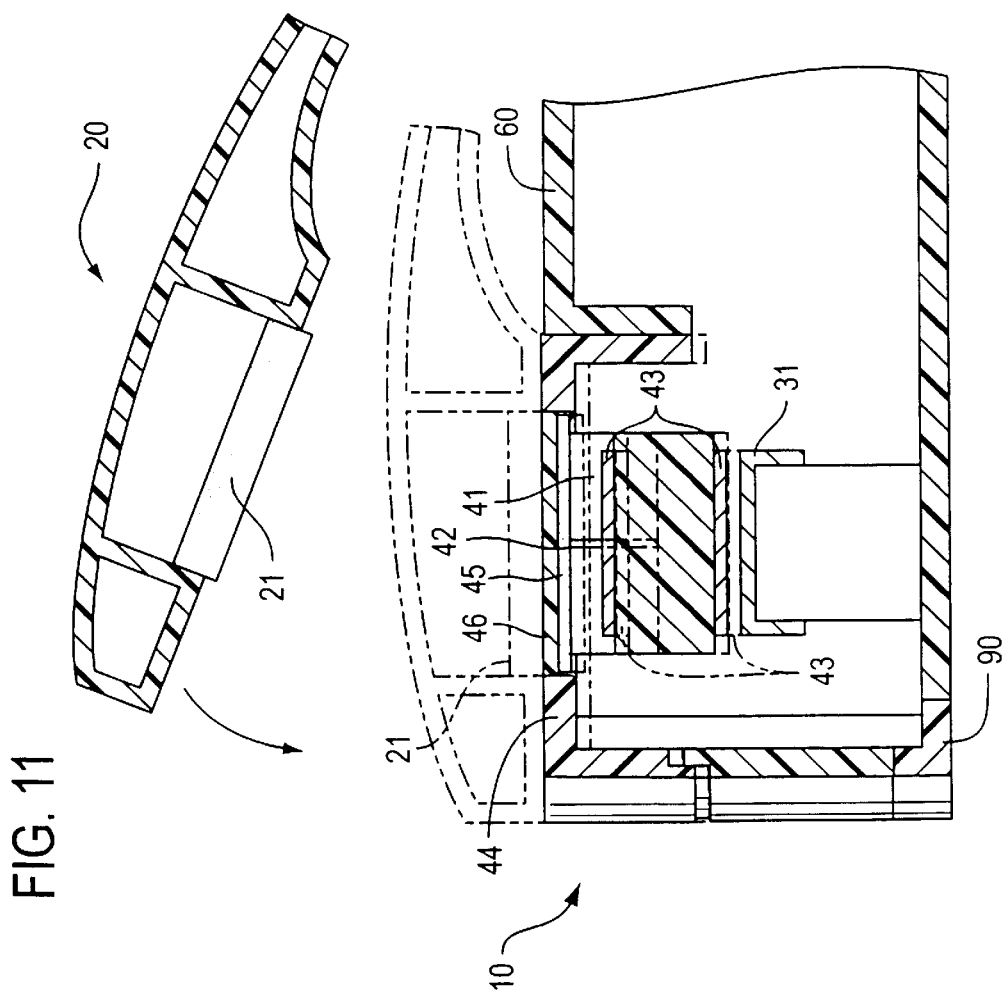
FIG. 11 is a sectional side view showing the metal contact plates in and out of contact according to the present invention.

Referring to FIGS. 1, 2 and 11 when the press handle 20 is depressed, the heat sealing unit 40 is lowered, and the metal contact plates 43 of the heat sealing unit 40 are respectively forced into contact with the metal contact plates 31 in the casing 10, thereby causing electricity to be connected to the electric heating wire 42. After sealing, the press handle 20 is released, and the heat sealing unit 40 is pushed upwards by the compression spring 111 to disconnect its metal contact plates 43 from the metal contact plates 31 in the casing 10, and therefore electricity is cut off.

Figure 4:
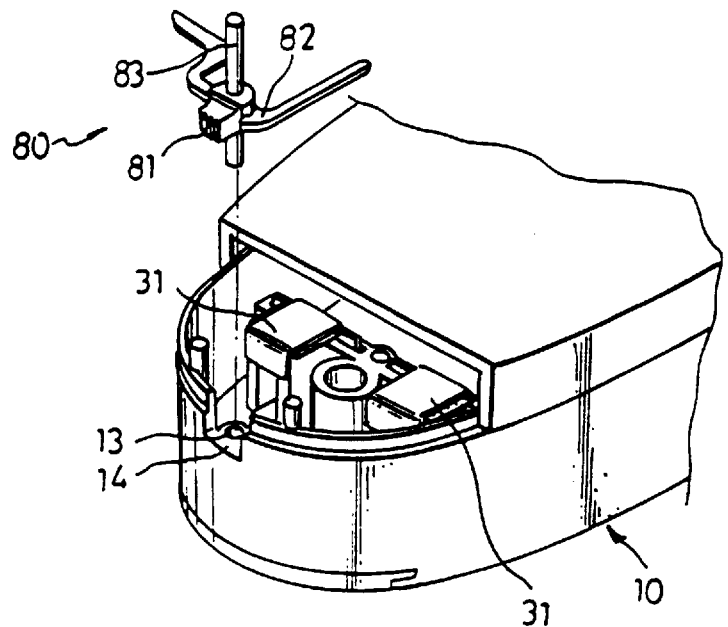
FIG. 4 shows the safety switch disconnected from the casing according to the present invention.

Referring to FIG. 4 and FIG. 1 again, a safety switch 80 is mounted in the front end of the casing 10. The safety switch 80 comprises a switch 81, an electrically insulative bumper 82, and a shaft 83. The shaft 83 is inserted into a hole 13 inside the casing 10 at its front end. The switch lever 81 extends out of a front notch 14 of the casing 10. The electrically insulative bumper 82 has a V-shaped profile.

Figure 5:
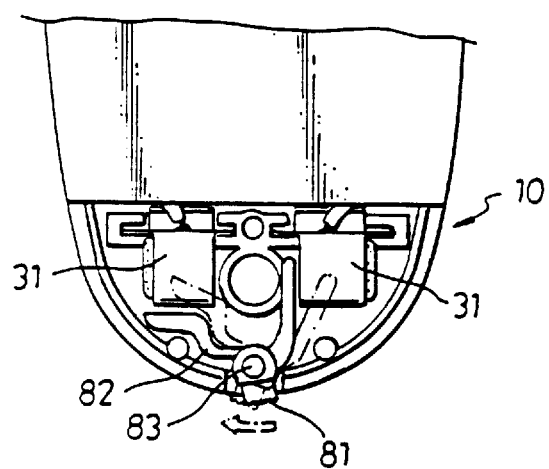
FIG. 5 is a top view of a part of the present invention, showing the safety switch installed and turned.

Referring to FIG. 5, when the hand-held electric heat sealing apparatus is not in use, the switch lever 81 is shifted to the off position forcing the electrically insulative bumper 82 into contact with the metal contact plates 31 at the top, and therefore the metal contact plates 43 of the heat sealing unit 40 are prohibited from touching the metal contact plates 31 in the casing 10. When to use the hand-held electric heat sealing apparatus, the switch lever 81 is shifted to the on position to move the electrically insulative bumper 82 away from the metal contact plates 31 in the casing 10, allowing the metal contact plates 43 of the heat sealing unit 40 to be forced into contact with the metal contact plates 31 in the casing 10 to close the circuit.

Figure 6:
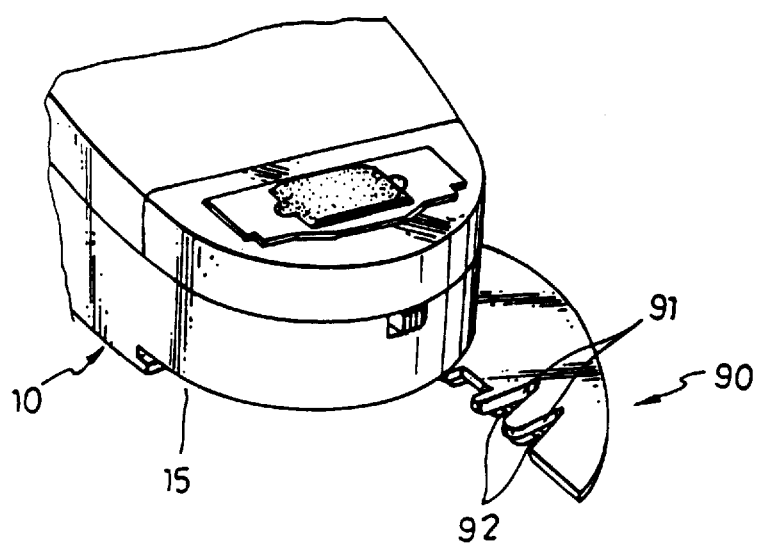
FIG. 6 is an elevational view of a part of the present invention, showing the safety cutter holder moved out of the bottom chamber of the casing.

Referring to FIG. 6 and FIG. 1 again, the casing 10 further comprises a bottom opening 15. A swivel cutter holder 90 is pivotally connected to the casing 10. The swivel cutter holder 90 can be turned inwards and received in the bottom opening 15 of the casing 10 (see FIG. 1), or turned outwards and extended out of the bottom opening 15 of the casing 10 (see FIG. 6). The swivel cutter holder 90 comprises two notches 91, and a cutter blade 92 fastened to the notches 91. Because the cutter blade 92 is mounted within the notches 91, it does not cut the user's fingers when their user turns the cutter holder 90 with the hand.

Figure 7:
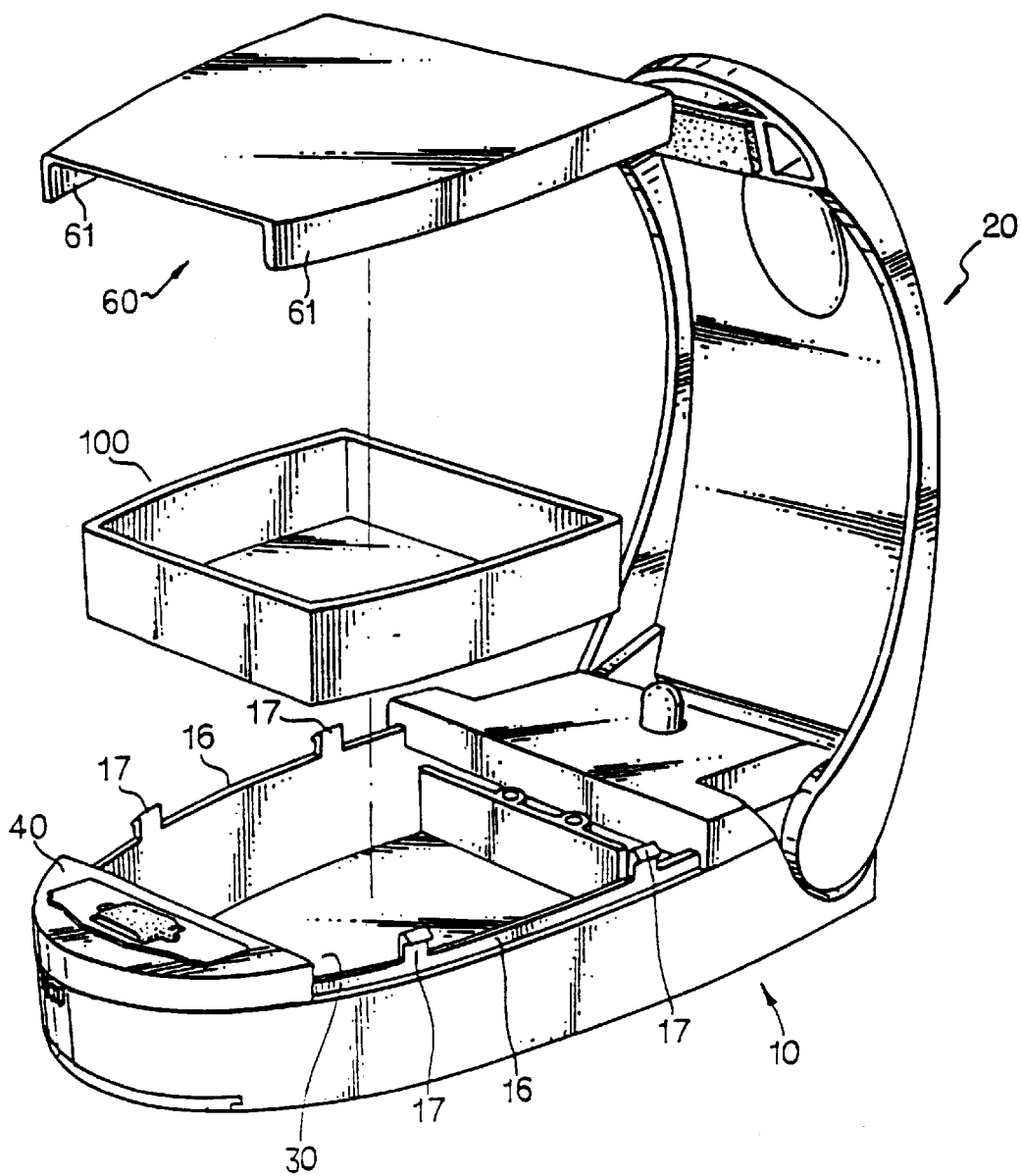
FIG. 7 is an exploded view of an alternate form of the present invention.
Figure 8:
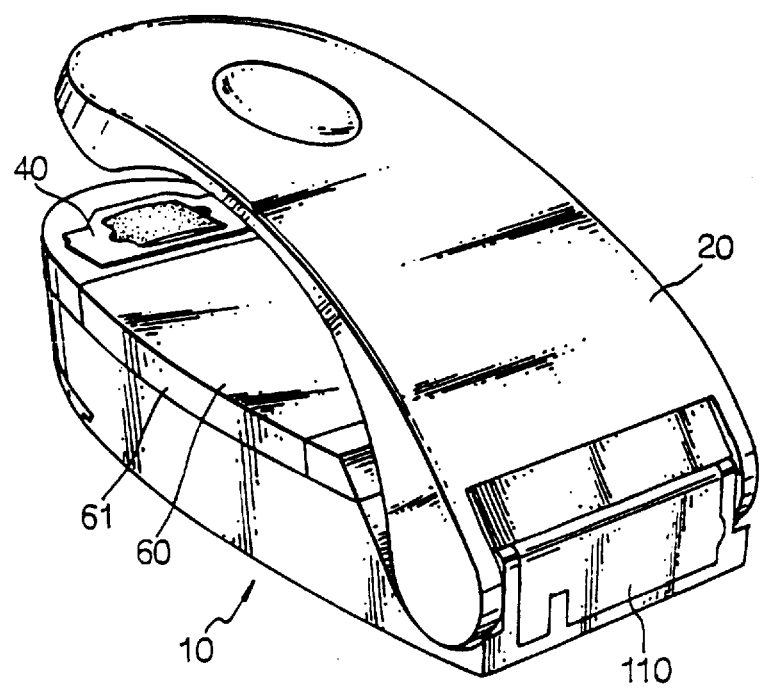
FIG. 8 is an oblique rear elevation of the present invention.
Figure 9:
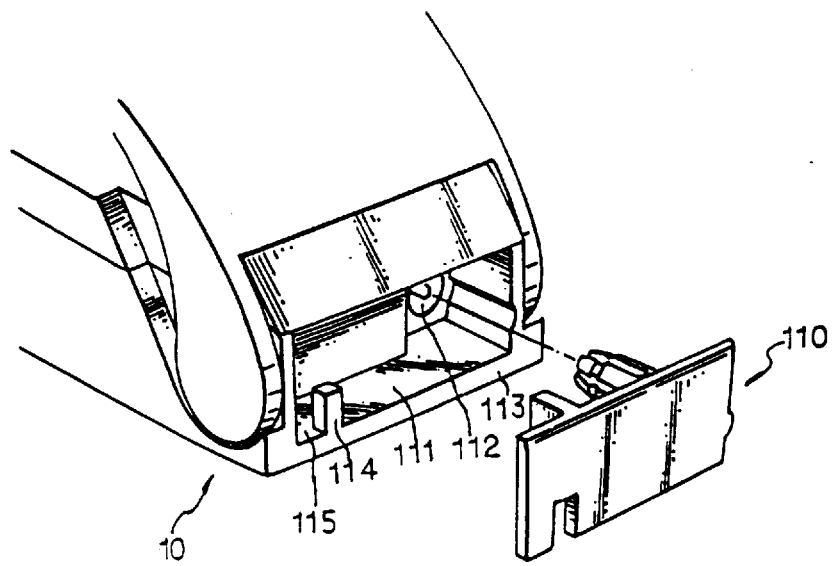
FIG. 9 shows the rear cover removed from the rear chamber of the casing according to the present invention.
Figure 10:
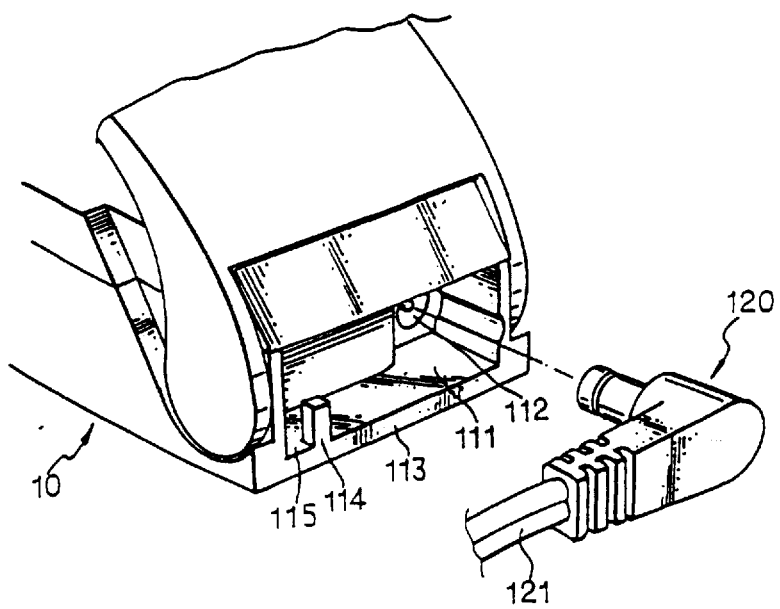
FIG. 10 shows the relationship between the electric socket and upright stop rod of the casing and the electric plug according to the present invention.

FIG. 7 shows an alternate form of the present invention. This alternate form comprises an AC power supply. According to this alternate form, the chamber 30 of the casing 10 comprises two upright side walls 16 and a plurality of hooks 17 respectively raised from the upright side walls 16. A metal case 100 is mounted within the chamber 30 of the casing 10 and retained between the vertical side walls 16. The intermediate cover plate 60 is covered over the metal case 100, having two downward mounting flanges 61 at two opposite sides respectively forced into engagement with the hooks 17. The metal case 100 increases the weight of the hand-held electric heat sealing apparatus, and simultaneously imparts an outward pressure to the upright side walls 16 of the chamber 30 to force the hooks 17 into engagement with the downward mounting flanges 61 of the intermediate cover plate 60.

Referring to FIGS. from 8 to 10, the casing 10 comprises a rear chamber 111, a rear cover 110 covered on the rear chamber 111, an electric socket 112 disposed in the rear chamber 111, an upright stop rod 114 disposed at the entrance 113 of the rear chamber 111, and a retaining hole 115 at the entrance 113 of the rear chamber 111. When the rear cover 110 is removed from the rear chamber 111 of the casing 10, an electric plug 120 can be connected to the electric socket 112 to transmit electric power to the heat sealing unit of the hand-held electric heat sealing apparatus, and the electric wire 121 of the electric plug 120 can be inserted through the retaining hole 115 and extended out of the rear chamber 111 of the casing 10.

It is to be understood that the drawings are designed for purposes of illustration only, and are not intended as a definition of the limits and scope of the invention disclosed.

What the invention claimed is:

1. A hand-held electric sealing apparatus comprising:
   (a) a casing having a front end and a rear end,
   (b) a compression spring mounted near said front end of said casing,
   (c) a heat sealing unit supported on said compression spring, said heat sealing unit comprising:
      (i) a heat insulative base,
      (ii) an electric heating wire secured to said heat insulative base
      (iii) a cover shell covering said heat insulative base and having defined therein an opening through which a portion of said heat insulative base and said electric heating wire project,
      (iv) a cover frame secured to said cover shell, and
      (v) a heat insulative sheet disposed between said cover frame and said cover shell, and
   (d) a press handle having a front end and a rear end pivotally connected to said rear end of said casing.

2. The hand-held electric sealing apparatus of claim 1 further comprising a power supply circuit having a pair of metal contact plates mounted inside said casing and connected to two opposite terminals of a power source.

3. The hand-held electric sealing apparatus of claim 2 wherein said electric heating wire is secured to said base by a pair of metal contact plates that are adapted for connecting to the pair of metal contact plates of said power supply circuit.

4. The hand-held electric sealing apparatus of claim 1 further comprising a spring mounted near said rear end of said casing for imparting an upward pressure to said press handle.

5. The hand-held electric sealing apparatus of claim 1 wherein said press handle has a heat insulative pad attached at said front end.

6. The hand-held electric sealing apparatus of claim 1 wherein said compression spring is mounted in a cylindrical upright support disposed near said front end of said casing.

7. A hand-held electric heat sealing apparatus comprising a casing having a front end and a rear end, a compression spring mounted in the front end of said casing, a power supply circuit having a pair of metal contact plates mounted inside said casing and connected to to two opposite terminals of a power source, a heat sealing unit mounted in the front end of said casing and supported on said compression spring and moved vertically relative to said casing, a press handle having a rear end pivotally connected to the rear end of the casing and a front end mounted with a heat insulative pad adapted to press an object against said heat sealing unit for permitting it to be sealed, said heat sealing unit comprising a heat insulative base having a projecting block raised from said heat insulative base in the middle, an electric heating wire fastened to said heat insulative base, and two metal contact plates disposed at two opposite sides of said heat insulative base and connected to two opposite ends of said electric heating wire and adapted for connecting to the two metal contact plates of said power supply circuit, wherein: said heat sealing unit comprises a cover shell covered on the front end of said casing over said heat insulative base and having a center opening through which the projecting block of said heat insulative base projects out of said cover shell, a heat insulative sheet supported on said cover shell over its center opening and disposed in contact with the electric heating wire of said heat sealing unit, and a cover frame fastened to said cover shell to hold said heat insulative sheet in place.

8. The hand-held electric heat sealing apparatus of claim 7, wherein said heat insulative sheet is preferably made from a meshed metal sheet coated with TEFLON®.

9. The hand-held electric heat sealing apparatus of claim 1, wherein said cover shell of said heat sealing unit has two insertion holes spaced from two opposite sides of its center opening, and the cover frame of said heat sealing unit has two downward plug strips at two opposite ends respectively plugged into the insertion slots of said cover shell.

10. The hand-held electric heat sealing apparatus of claim 1, wherein the cover frame of said heat sealing unit has a center opening corresponding to the center opening of said cover shell through which a part of said heat insulative sheet and the projecting block of said heat insulative base can be forced out of the cover frame of said heat sealing unit.

11. The hand-held electric heat sealing apparatus of claim 7, wherein the projecting block of said heat insulative base of said heat sealing unit has a smoothly arched cross section.

12. A hand-held electric heat sealing apparatus comprising a casing having a front end and a rear end, a compression spring mounted in the front end of said casing, a power supply circuit having a pair of metal contact plates mounted inside said casing and connected to two opposite terminals of a power source, a heat sealing unit mounted in the front end of said casing and supported on said compression spring and moved vertically relative to said casing, a press handle having a rear end pivotally connected to the rear end of the casing and a front end mounted with a heat insulative pad adapted to press an object against said heat sealing unit for permitting it to be sealed, said heat sealing unit comprising a heat insulative base having a projecting block raised from said heat insulative base in the middle, an electric heating wire fastened to said heat insulative base, and two metal contact plates disposed at two opposite sides of said heat insulative base and connected to two opposite ends of said electric heating wire and adapted for connecting to the two metal contact plates of said power supply circuit, wherein a safety switch is mounted in the front end of said casing, and comprised of a switch lever extended out of said casing, and an electrically insulative bumper connected to said switch lever, said electrically insulative bumper being moved by said switch lever between a first position in which said electrically insulative bumper is stopped above the metal contact plates of said power supply circuit to prohibit contact of the metal contact plates of said heat sealing unit from the metal contact plates of said power supply circuit, and a second position in which said electrically insulative bumper is moved away from the metal contact plates of said power supply circuit for permitting the metal contact plates of said heat sealing unit to be forced into contact with the metal contact plates of said power supply circuit.

13. The hand-held electric heat sealing apparatus of claim 12, wherein said switch lever and said electrically insulative bumper are integrally molded from plastic and mounted on a revolving shaft in a hole at the front end of said casing.

14. The hand-held electric heat sealing apparatus of claim 13, wherein said electrically insulative bumper has a B-shaped profile.

15. The hand-held electric heat sealing apparatus of claim 12, wherein said casing has a bottom chamber and a pivoted safety cutter means moved in and out of said bottom chamber, said safety cutter means comprising a cutter holder having at least one notch at one side and a cutter blade fastened to said cutter holder within said at least one notch.

16. A hand-held electric heat sealing apparatus comprising a casing; a heat sealing unit, and a press handle pivotally connected to said casing and forced to act against said heat sealing unit, said casing comprising a top chamber, and a top cover plate covered on said top chamber, wherein said top chamber comprises two upright side walls at two opposite sides, a rigid member mounted on the inside and stopped between said upright side walls, and a plurality of hooks raised from said upright side walls, said top cover plate having two downward mounting flanges respectively forced into engagement with the hooks of the upright side walls of said top chamber.

17. The hand-held electric heat sealing apparatus of claim 16, wherein said rigid member is a metal case.

18. The hand-held electric heat sealing apparatus of claim 16, wherein said casing comprises a rear chamber at one end, an electric socket adapted for receiving an electric plug for transmitting electricity to said heat sealing unit, an upright stop rod disposed inside said rear chamber and spaced from said electric socket at one side and adapted for holding the electric wire of the electric plug which is connected to said electric socket.

19. The hand-held electric heat sealing apparatus of claim 16, wherein said upright stop rod is disposed at an entrance of said rear chamber and defining with an inside wall of said casing a retaining hole for holding the electric wire of the electric plug which is connected to said electric socket.

* * * * *